United States Patent
Jones

(10) Patent No.: US 11,805,733 B2
(45) Date of Patent: Nov. 7, 2023

(54) GRASS CATCHER AND METHOD OF FABRICATION

(71) Applicant: Nicholas Jones, Cherry Hill, NJ (US)

(72) Inventor: Nicholas Jones, Cherry Hill, NJ (US)

(*) Notice: Subject to any disclaimer, the term of this patent is extended or adjusted under 35 U.S.C. 154(b) by 463 days.

(21) Appl. No.: 17/000,866

(22) Filed: Aug. 24, 2020

(65) Prior Publication Data
US 2022/0053696 A1    Feb. 24, 2022

(51) Int. Cl.
*A01D 43/063*    (2006.01)

(52) U.S. Cl.
CPC ..... *A01D 43/0635* (2013.01); *A01D 43/0638* (2013.01)

(58) Field of Classification Search
CPC .......... A01D 43/0635; A01D 43/0636; A01D 43/0638; A01D 43/063; A01D 43/06; A01D 34/667; A01D 34/71; A01D 34/63; A01D 34/66; A01D 43/002; A01D 42/06
See application file for complete search history.

(56) References Cited

U.S. PATENT DOCUMENTS

| | | | | |
|---|---|---|---|---|
| 2,836,029 A | * | 5/1958 | Johnson | A01D 34/63 37/243 |
| 2,855,745 A | * | 10/1958 | Phelps | A01D 43/063 56/202 |
| RE24,877 E | * | 9/1960 | Mastantuono et al. | A01D 43/063 56/202 |
| 3,820,313 A | * | 6/1974 | Hoffmann | A01D 43/063 56/202 |
| 5,074,106 A | * | 12/1991 | Di Paolo | A01D 43/063 56/320.2 |
| 5,398,491 A | * | 3/1995 | Hartley | A01D 34/71 56/320.2 |
| 2007/0186531 A1 | * | 8/2007 | Mossman | A01D 61/002 56/119 |
| 2021/0029875 A1 | * | 2/2021 | Takahashi | A01D 34/71 |
| 2021/0251143 A1 | * | 8/2021 | Gaeddert | A01D 43/0635 |

FOREIGN PATENT DOCUMENTS

| | | | | |
|---|---|---|---|---|
| AU | 2004201923 A1 | * | 6/2005 | |
| CN | 110651594 A | * | 1/2020 | ......... A01D 43/0635 |
| DE | DD-154054 A1 | * | 2/1982 | |

* cited by examiner

*Primary Examiner* — Adam J Behrens
*Assistant Examiner* — Madeline I Runco
(74) *Attorney, Agent, or Firm* — Stuart A. Goldstein

(57) ABSTRACT

A grass catcher having a monocoque container which is downwardly tapered from its rear end to its front end, the rear end being open and larger in size than the front end. A front wall closes off the front end. A continuous material sheet forms a flat top wall, a side wall, and a flat bottom wall. The side wall has a series of adjacently aligned, frustum segments. This side wall extends downward from the top wall which is fixedly attached to the front wall and a flat side wall. The side wall is fixedly attached directly to the front and bottom walls. The container has a plurality of hole patterns, which, in combination with the shape of the container, facilitate air flow through the grass catcher and thus the flow of loose grass clippings through the grass catcher.

5 Claims, 11 Drawing Sheets

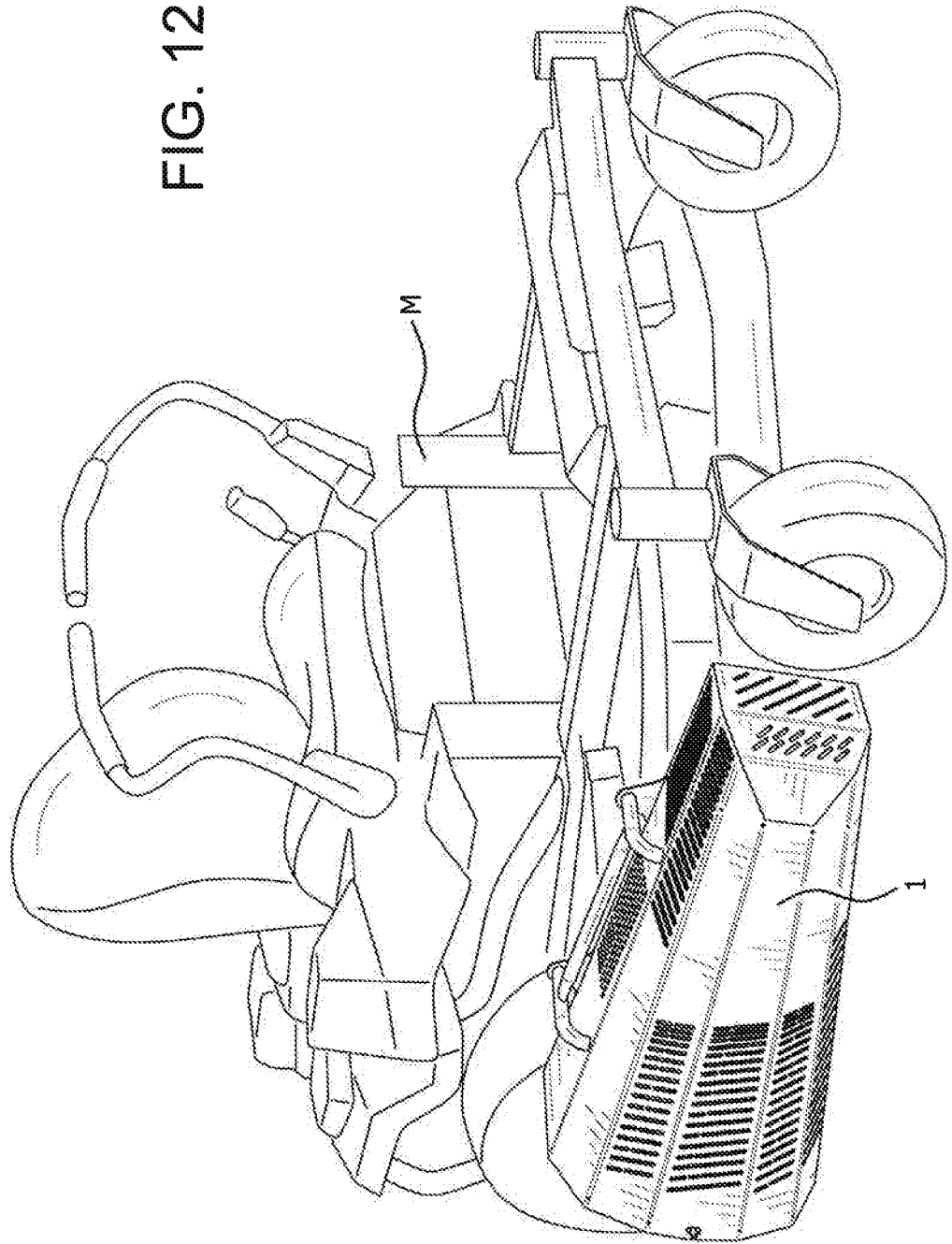

GRASS CATCHER AND METHOD OF FABRICATION

BACKGROUND OF THE INVENTION

Most of today's lawn mower grass catchers, whether they are attached to walk behind, self-propelled, or riding mowers, are made of flexible, pliant material or are constructed of a number of individual sections attached by framing members to form a rigid container. Of course, these grass catchers have short worklives since they are subject to tearing, in the case of flexible material catchers or, as to more rigid containers, breakage and damage to the sections or framing members, resulting in breakage of the catcher and its ability to retain grass clippings.

Current grass catchers also do not have the configuration or shape to adequately receive and collect grass clippings and then efficiently propel them, using effectively designed airflow openings, through to the rear of the container where the clippings are packed for ultimately removal. One such grass catcher is disclosed in U.S. Pat. No. 5,074,106. This catcher is basically a hollow cylinder which fails to adequately accumulate and propel clippings rearward.

SUMMARY OF THE INVENTION

It is thus the object of the present invention to overcome the limitations and disadvantages of existing grass catchers by providing a grass catcher comprising a durable, high strength, aerodynamically shaped, container which optimizes air flow for the effective movement of grass clippings through and to the rear of the grass catcher.

These and other objects are accomplished by the present invention, a grass catcher for attachment to a lawn mower, comprising a monocoque container which is downwardly tapered from the rear end of the container to its front end, the rear end being open and larger in size than the front end. A front wall closes off the front end. A single continuous sheet of material forms a flat top wall, a curved side wall, and a flat bottom wall. The curved side wall is configured as a series of adjacently aligned, frustum shape segments. This curved side wall extends downward The novel features which are considered as characteristic of the invention are set forth in particular in the appended claims. The invention itself, however, both as to its design, construction, and use, together with additional features and advantages thereof, are best understood upon review of the following detailed description with reference to the accompanying drawings.

BRIEF DESCRIPTION OF THE DRAWINGS

FIG. 12 is a view of the grass catcher of the present invention attached to a lawnmower.

DETAILED DESCRIPTION OF THE INVENTION

Figure 1:
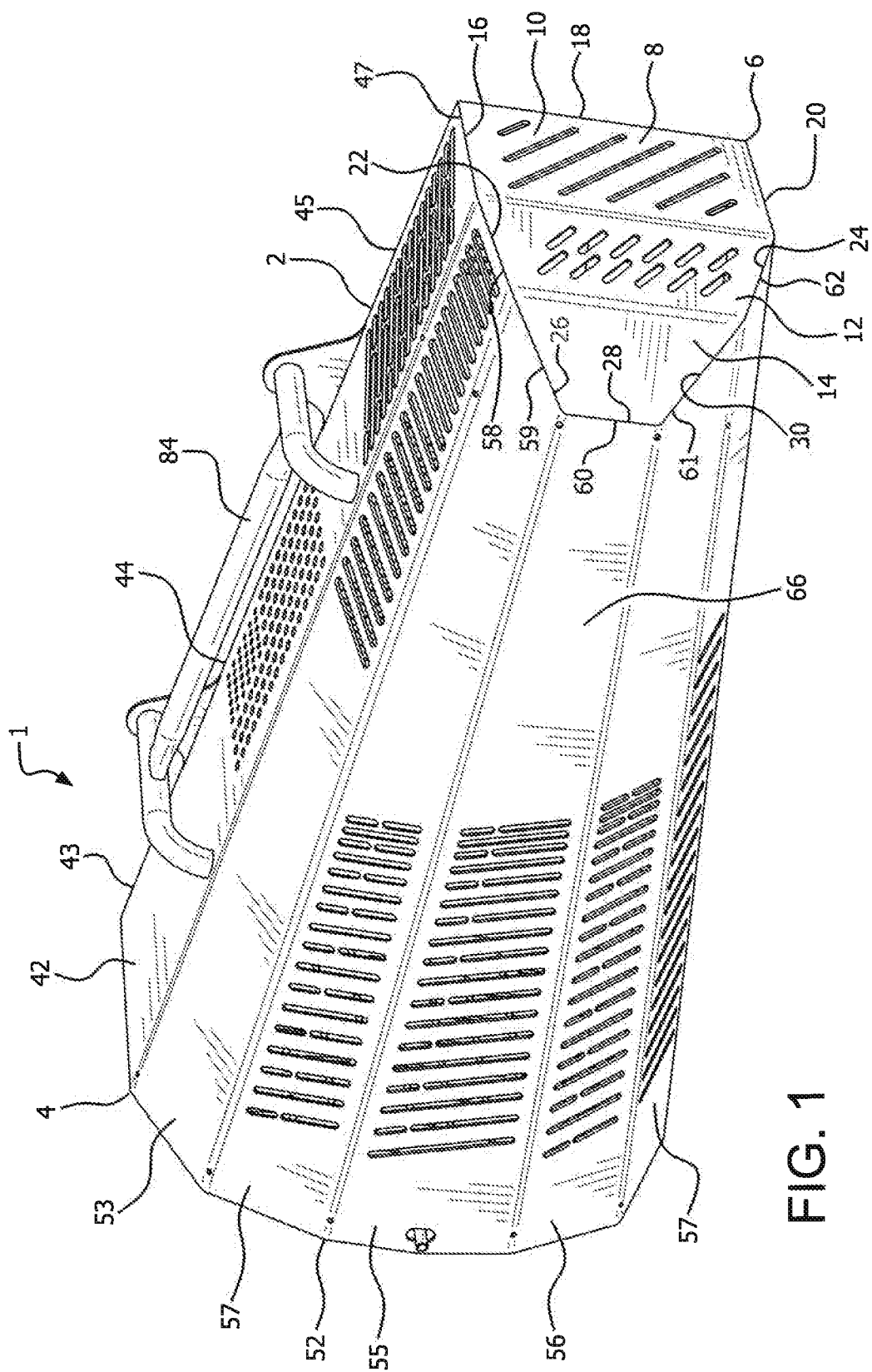
FIG. 1 is a perspective front view of the grass catcher of the present invention.
Figure 2:
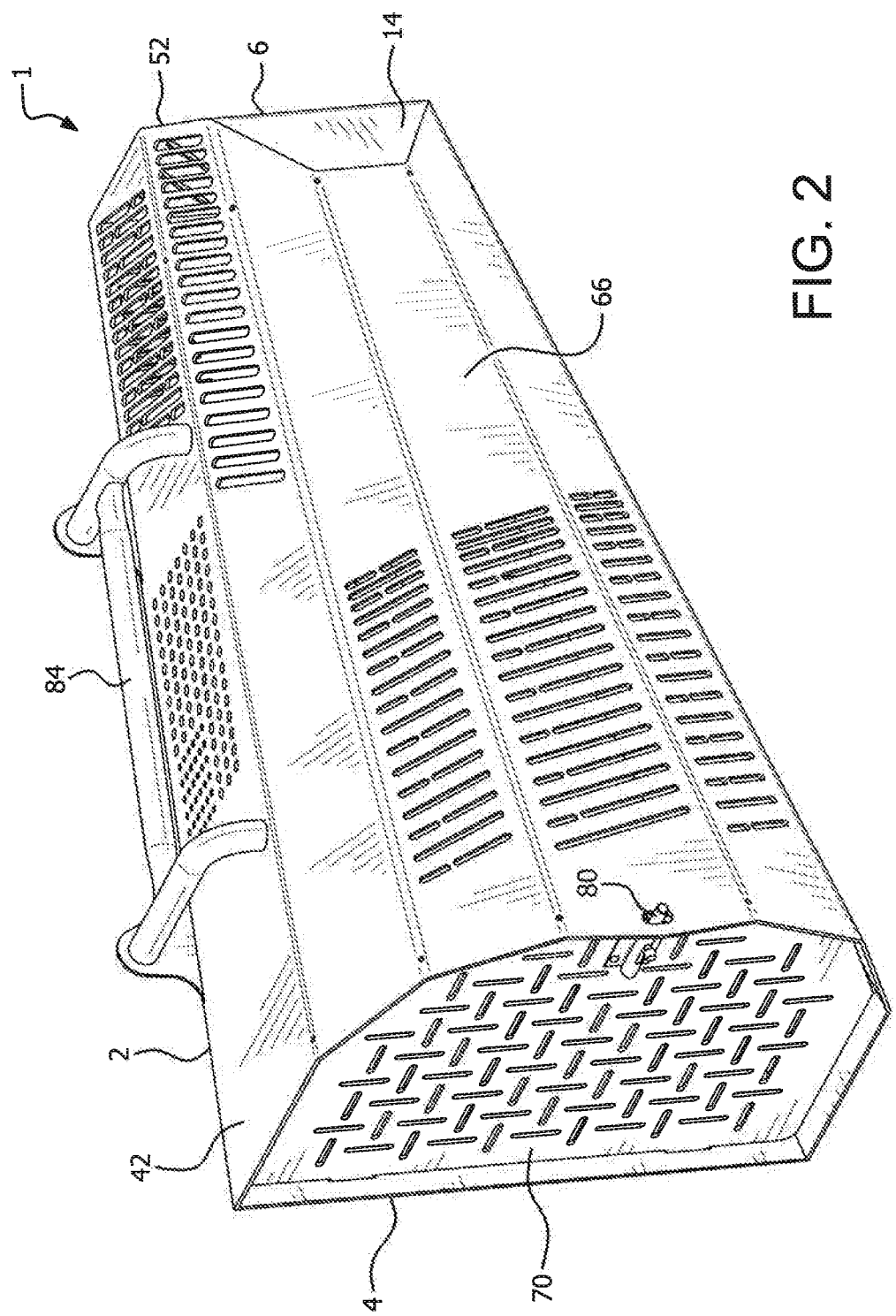
FIG. 2 is a perspective side view of the grass catcher of the present invention.
Figure 3:
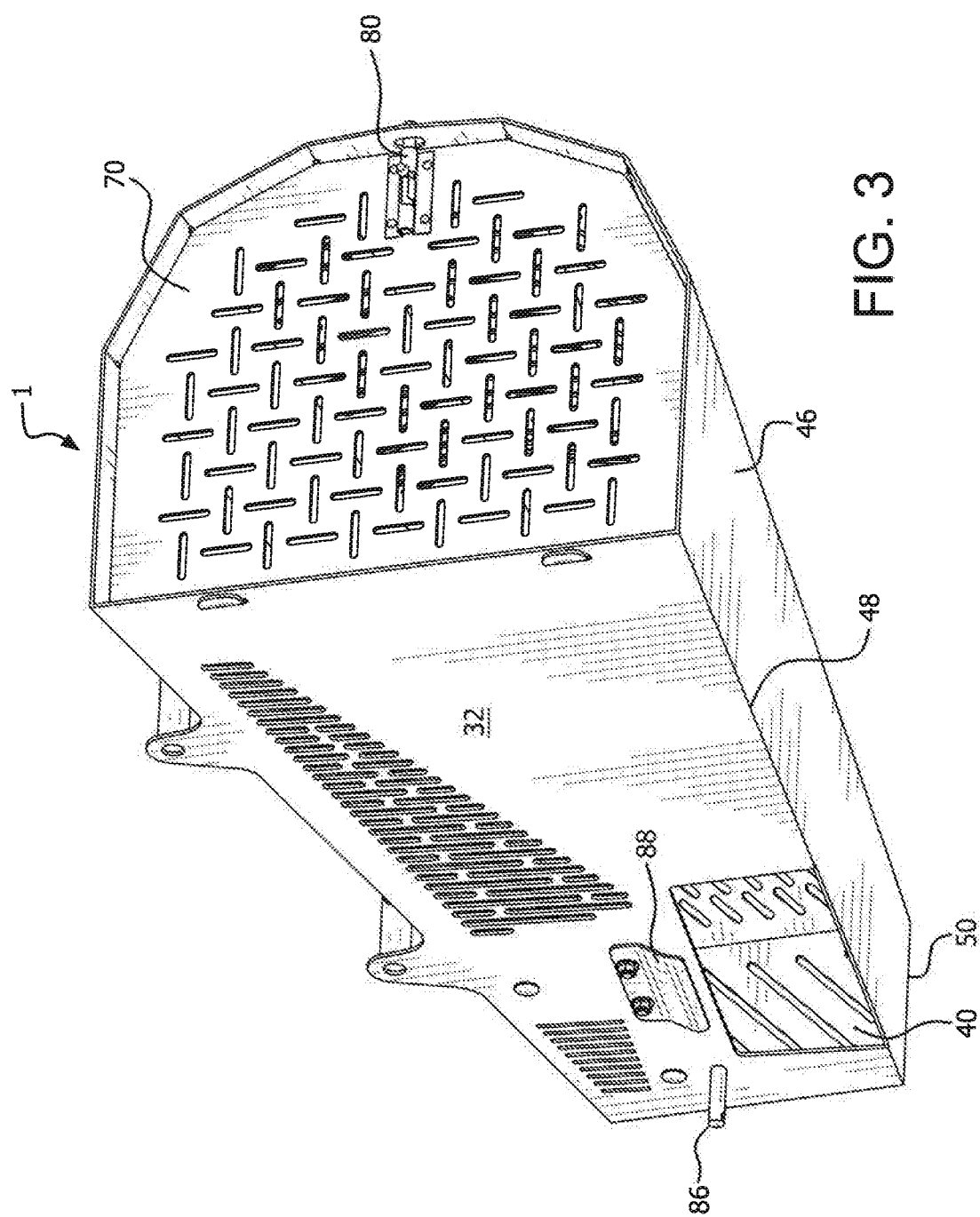
FIG. 3 is a perspective rear view of the grass catcher of the present invention.
Figure 4:
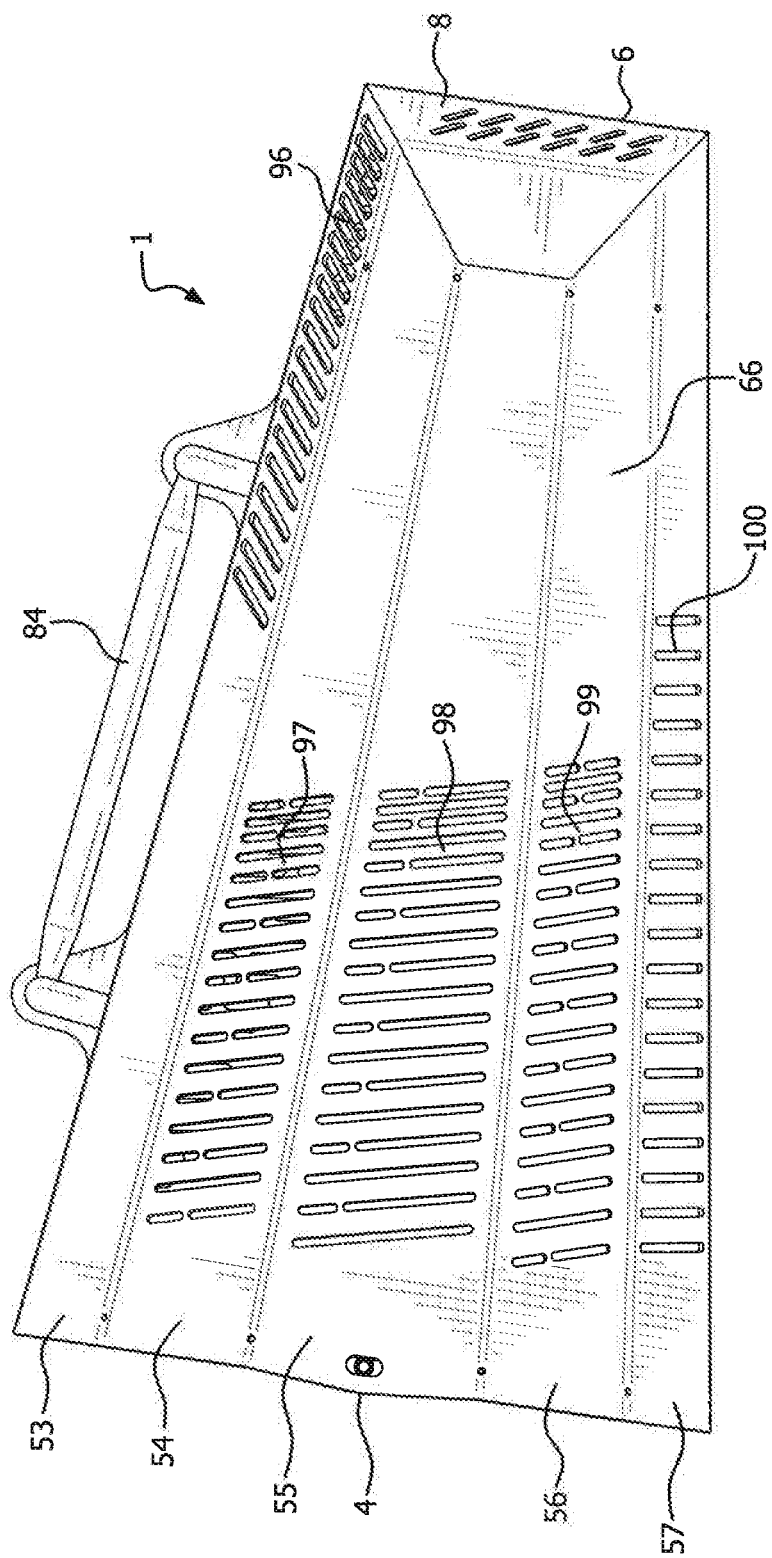
FIG. 4 is an elevation view of the grass catcher of the present invention.
Figure 5:
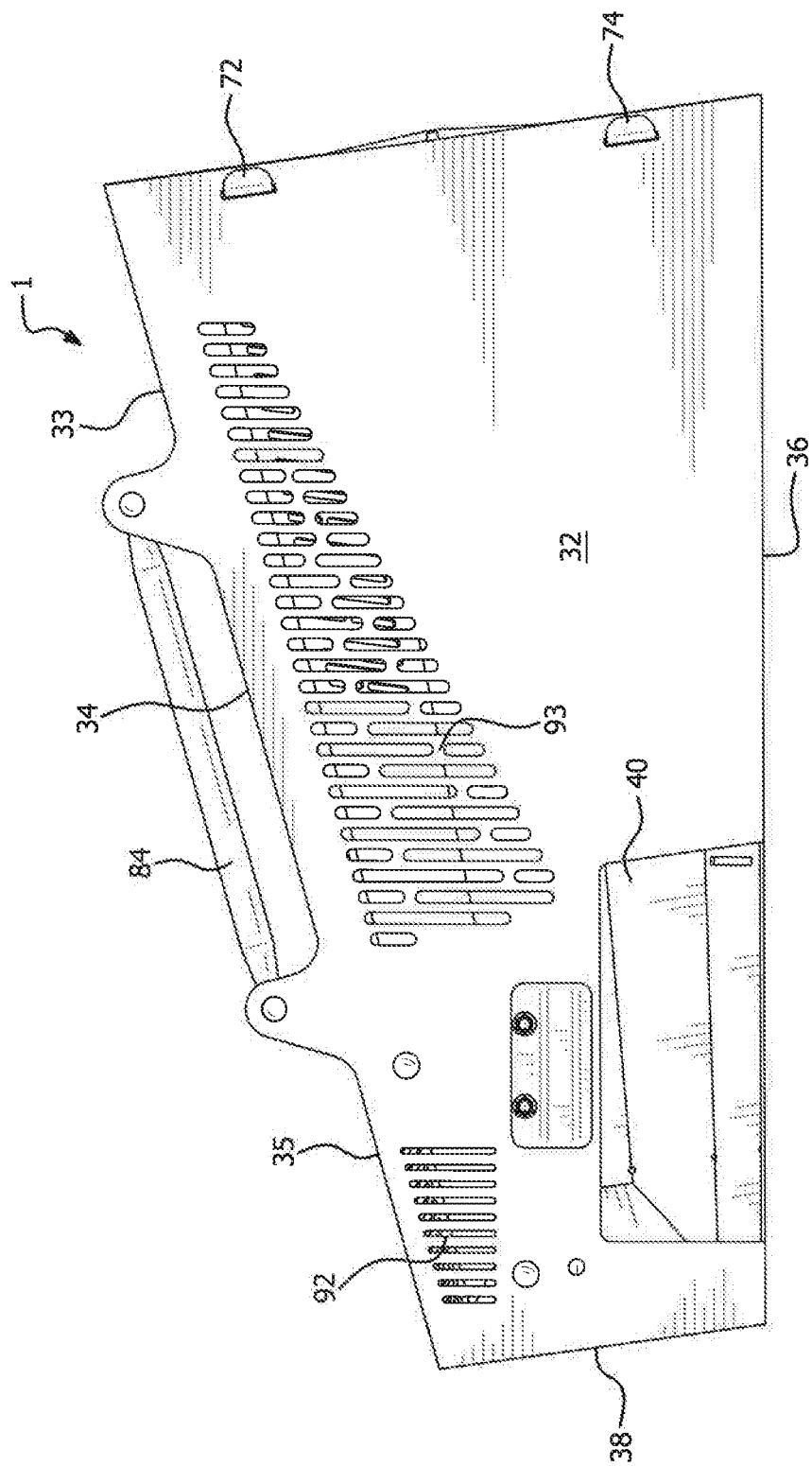
FIG. 5 is the opposite elevation view of the grass catcher of the present invention.
Figure 7:
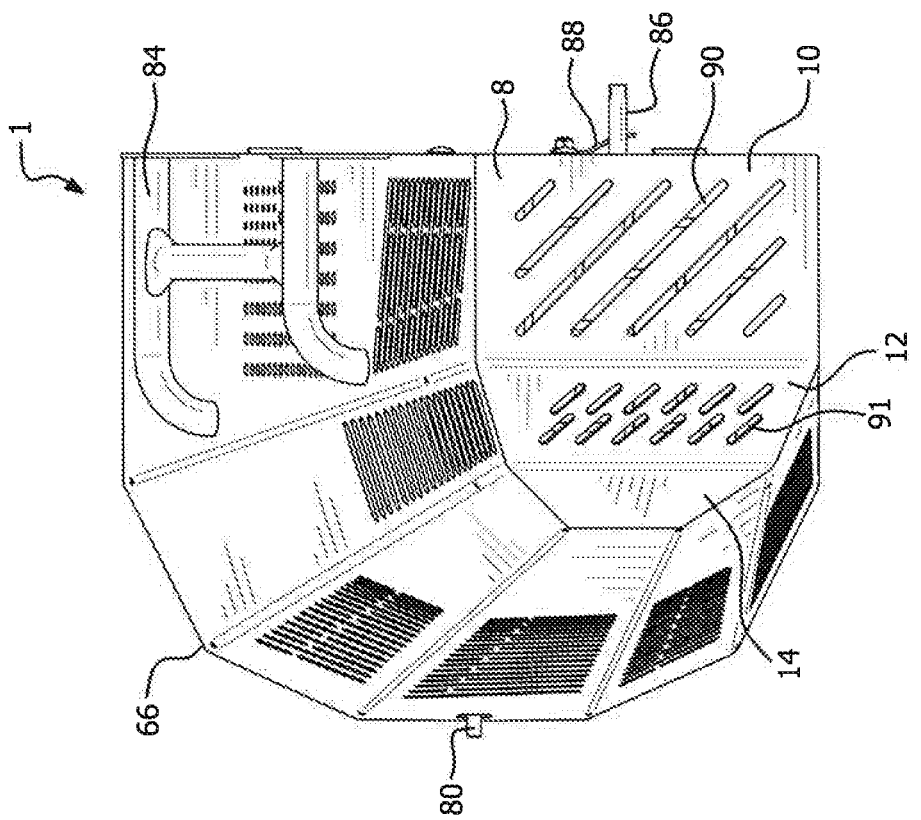
FIG. 7 is the front view of the grass catcher of the present invention.
Figure 6:
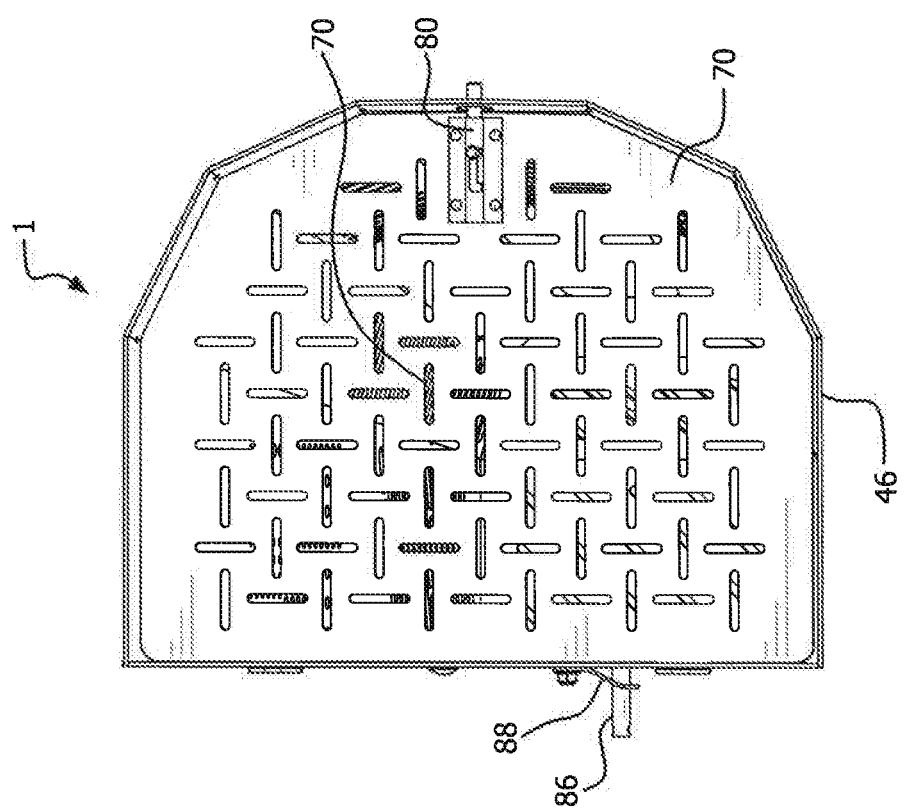
FIG. 6 is the rear view of the grass catcher of the present invention.
Figure 8:
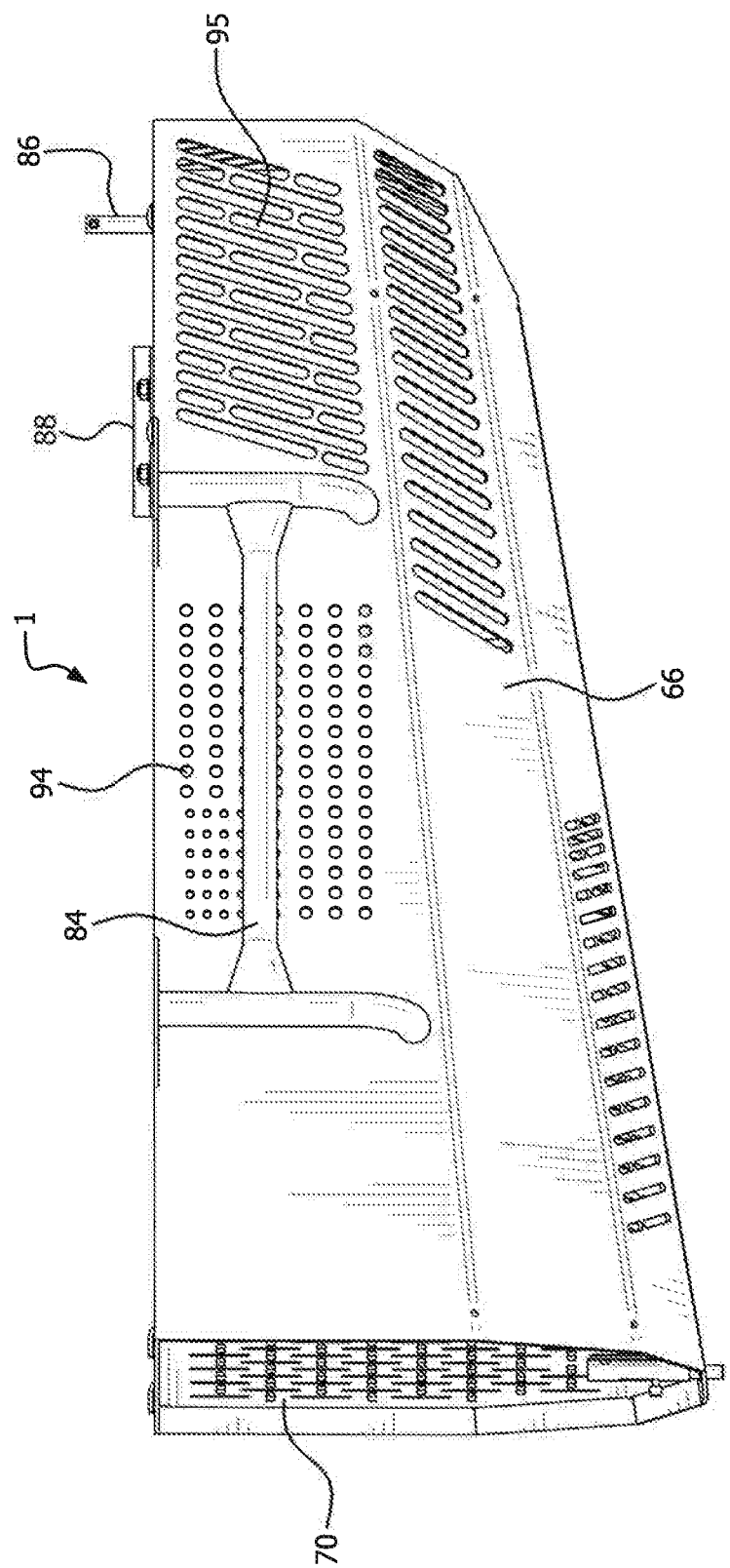
FIG. 8 is the top view of the grass catcher of the present invention.
Figure 9:
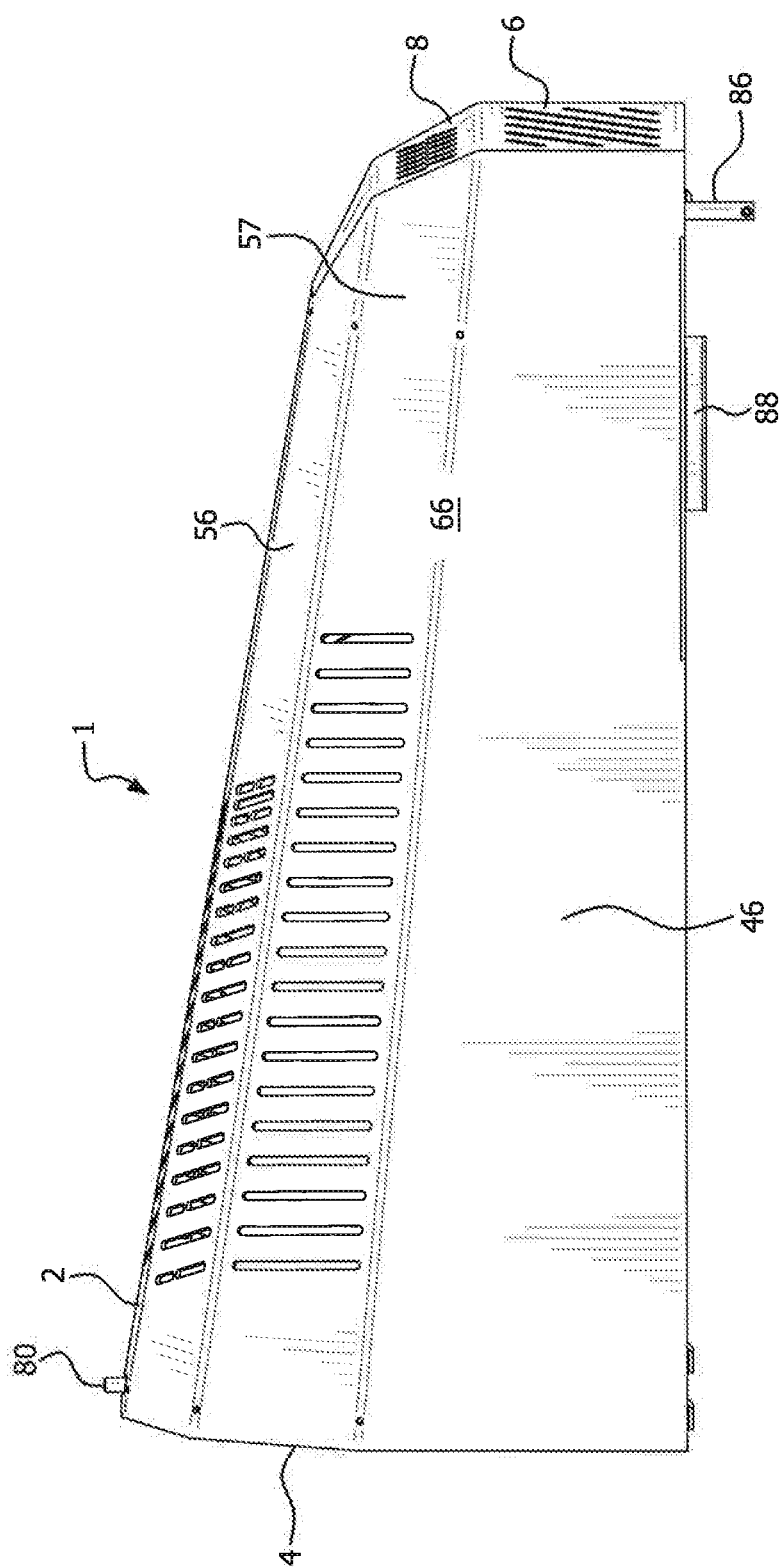
FIG. 9 is the bottom view of the grass catcher of the present invention.
Figure 10:
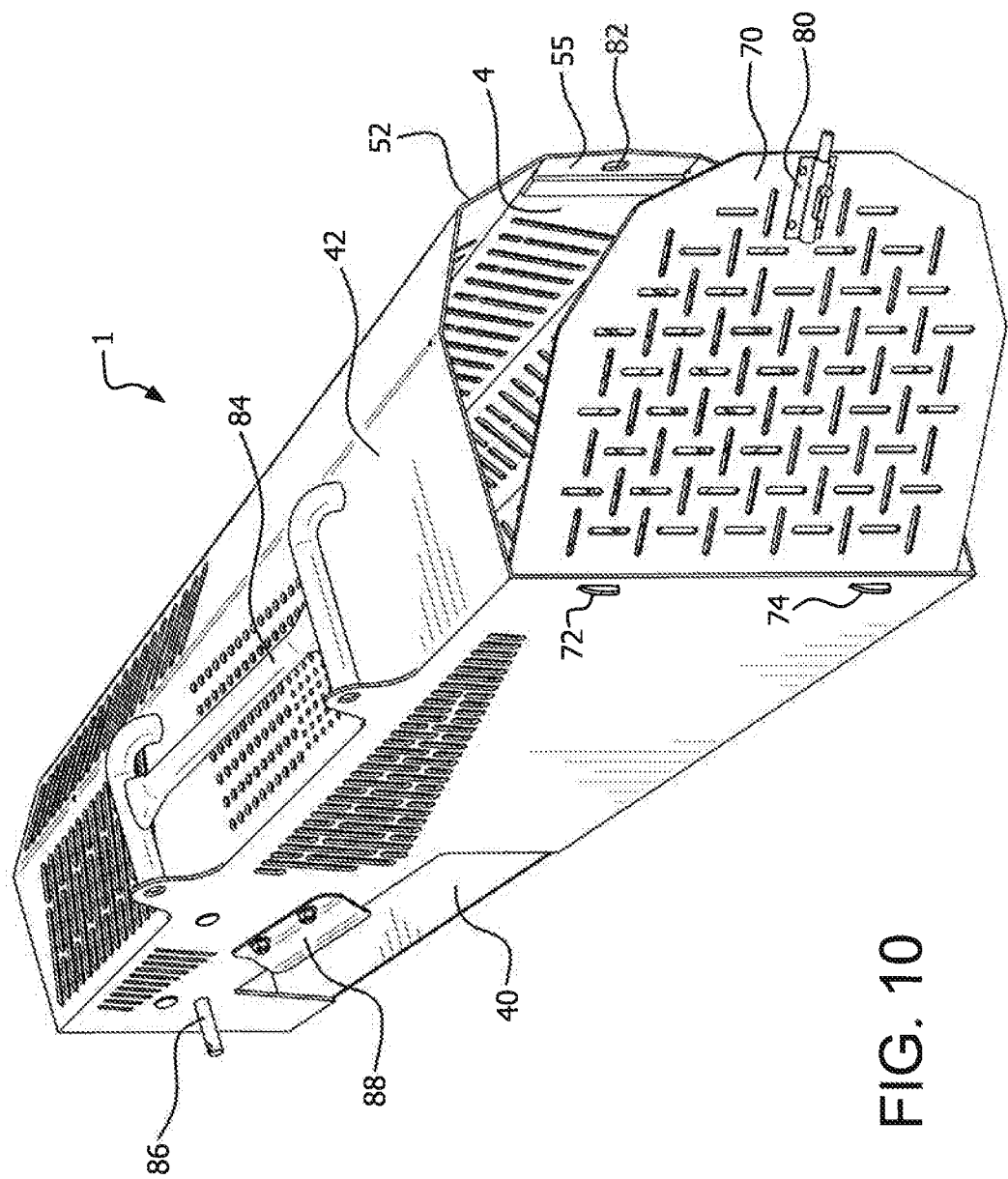
FIG. 10 is a rear perspective view of the grass catcher of the present invention with its cover in the open position.
Figure 11:
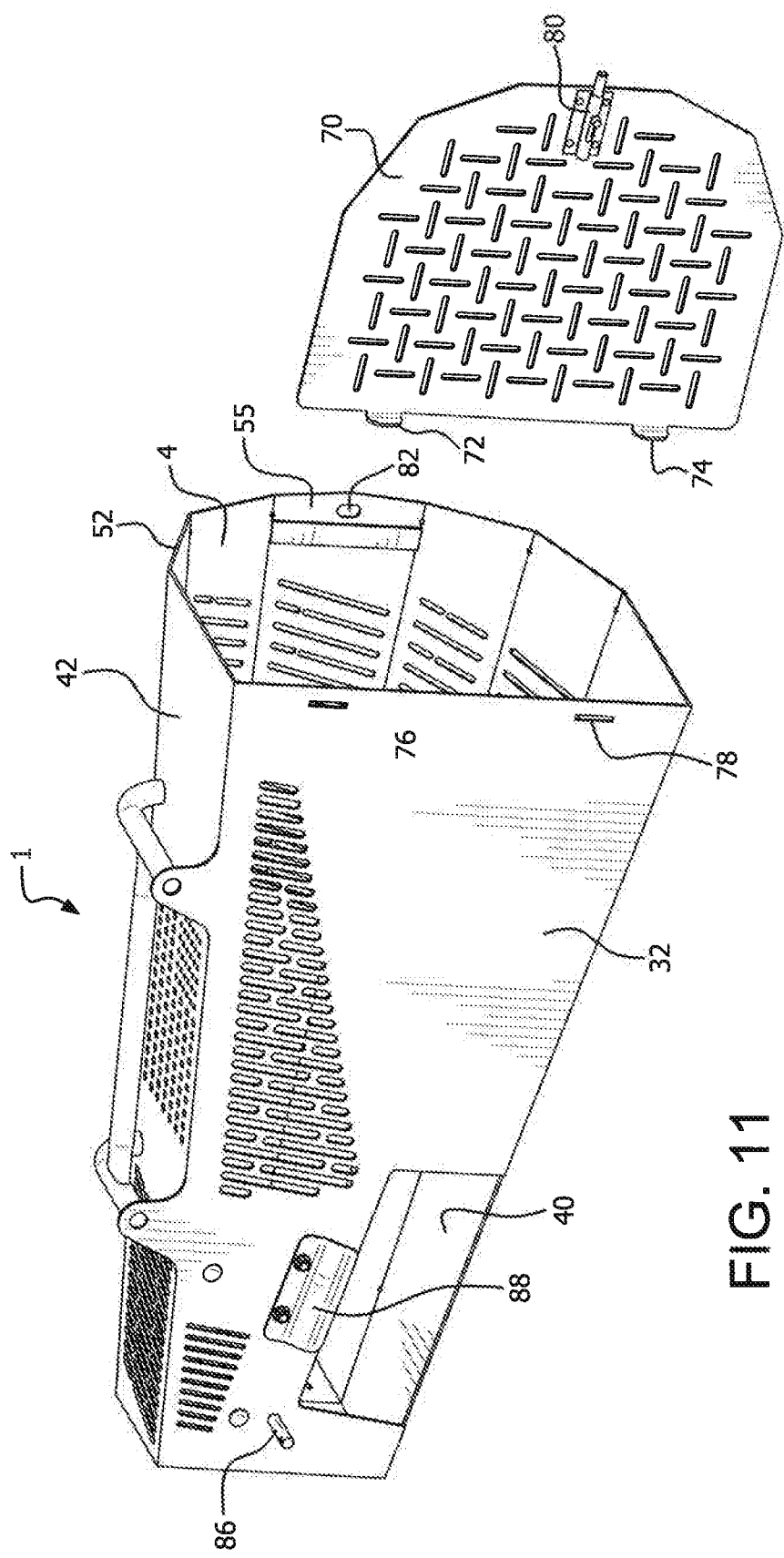
FIG. 11 is an exploded perspective view of the container and cover of the grass catcher of the present invention.

Grass catcher 1 comprises a monocoque container 2 which is downwardly tapered from its rear end 4 to its front end 6. Rear end 4 is open and larger in size than front end 6 which is closed off by front wall 8. Front wall 8 consists of front sections 10, 12, and 14. Front section 10 has top edge 16, side edge 18, and bottom edge 20. Front section 12 has top edge 22 and bottom edge 24. Front section 14 has top edge 26, side edge 28, and bottom edge 30.

Container 2 also has flat side wall 32 having top edges 33, 34, and 35, bottom edge 36 and side edge 38. Opening 40 extends through side wall 32. Flat top wall 42 of container 2 has side edges 43, 44, and 45 and front edge 47. Flat bottom wall 46 has side edge 48 and front edge 50.

Curved side wall 52 of container 2 extends downward from top wall 42. Side wall 52 comprises a series of adjacently aligned, frustum shaped segments 53, 54, 55, 56 and 57, each having a front edge 58, 59, 60, 61, and 62 respectively.

Front wall 8 is adjacent to side Wall 32 and curved side wall 52. Side wall 52 is adjacent to and extends from top wall 42 to bottom wall 46. Side wall 32 is also adjacent to bottom wall 46. Front wall 8, bottom wall 46, side wall 32, top wall 42, and second side wall 52 each have edges which are fixedly attached to the edges of the walls to which they are adjacent.

Specifically, front edges 58-62 of side wall segments 53-57 are attached by weld or like attachment means, to edges 22, 24, 26, 28, and 30 of front wall 8. By weld or like attachment means, side edge 48 of bottom wall 46 is attached to bottom edge 36 of side wall 32 and front edge 50 of the bottom wall is attached to bottom edge 20 of front section 10. Weld or like attachment means also attaches top edges 33-35 of side wall 32 to side edges 43-45 of top wall 42 and side edge 18 of front wall 8 to side edge 38 of side wall 32.

Open rear end 4 is closed off by hinged cover 70 having a hinge comprising upstanding tabs 72 and 74 which are configured to be positioned in slits 76 and 78 in side wall 32 of container 2. Cover 70 is secured in a closed position by extendable clasp 80 slideable into opening 82 of frustrum shaped segment 55 of side wall 52. When clasp 80 is slid out of opening 82, opening cover 70 90° will simultaneously remove tabs 72 and 74 front slits 76 and 78 in order to disengage cover 70 from container 2; thus allowing for fast removal of the cover for emptying grass catcher 1.

Ergonomically designed handle 84 is secured to top wall 42. Grass catcher connection means comprises pin 86 and hook bracket 88, provided to allow for easy and simple attachment and detachment of grass catcher 1 to and from mower M.

Specifically, engineered hole patterns are provided through the exterior of grass catcher 1 in order to optimize airflow and, hence, the free flowing of grass clippings received through opening 40 and into container 2 during both wet and dry conditions. These hole patterns are as follows: hole patterns 90 and 91 through front wall 8; hole patterns 92 and 93 through side wall 32; hole patterns 94 and 95 through top wall 42; hole pattern 96 through frustum segment 53; hole pattern 97 through frustum segment 54; hole pattern 98 through frustum segment 55; hole pattern 99 through frustum segment 56; hole pattern 100 through frustum segment 57; and hole pattern 101 through cover 70.

In addition, the unique shape of container 2 curves up and away from the ground and any obstacles and, significantly, facilitates the packing of grass clippings at the rear of grass catcher 1. This provides a denser packing of the clippings for a more efficient emptying of the full grass catcher.

The manner of fabrication of grass catcher 1 itself is unique and significant. Container 2 is formed as a monocoque shell in which top wall 42, curved side wall 52 consisting of segments 53-57, and bottom wall 46 are all formed from of a single continuous sheet 66 made of aluminum or like light-weight material. Sheet 66 is bent to form top wall 42, segments 53-57, and bottom wall 46. Welds are only necessary to attach front wall 8 and side wall 32; and these walls are attached by their edges directly to the edges of continuous sheet 66. By this design, there are far fewer welded or like connections between the numerous and different sections which are present in today's commonly manufactured grass catcher containers. Such connections are continuously susceptible of failing. As a result of the manner of construction of the container shell of the present invention, a grass catcher is created which has optimum strength and durability.

Certain novel features and components of this invention are disclosed in detail in order to make the invention clear in at least one forth thereof. However, it is to be clearly understood that the invention as disclosed is not necessarily limited to the exact form and details as disclosed, since it is apparent that various modifications and changes may be made without departing from the spirit of the invention.

The invention claimed is:

1. A grass catcher for horizontal attachment to a lawn mower, the grass catcher comprising:
    a monocoque container configured to be attached in a horizontal position along the side of a lawn mower, said container, as attached in said horizontal position being downwardly tapered from the rear end of the container to the front end of the container, the rear end being open and larger in size than the front end, the container, as attached in the horizontal position to the lawn mower, comprising:
        a vertical front wall which closes off the front end;
        a horizontal flat bottom wall fixedly attached directly to the front wall;
        a horizontal flat side wall on one side of the container and having an opening, said side wall being fixedly attached directly to the front wall and the bottom wall; and
        a flat top wall and a second side wall on the opposite side of the container, said second side wall comprising a series of adjacently aligned, frustum shaped segments, said second side wall extending horizontally from the front end of the container to the rear end of the container and downwardly from the top wall to the bottom wall, wherein the top wall is fixedly attached directly to the front wall and the flat side wall and the second side wall are fixedly attached directly to the front wall and the bottom wall;
    a cover removably attached to the rear end of the container, wherein the front wall, the flat side wall, the top wall, the second side wall, and the cover each have a plurality of hole patterns to facilitate air flow through the grass catcher;
    a handle attached to the top wall; and
    grass catcher connection means for removably attaching the grass catcher to the lawn mower.

2. The grass catcher as in claim 1 further wherein the front wall, the flat bottom wall, the flat side wall, the flat top wall, and the second side wall each have edges which are fixedly attached directly to the edges of the wall to which they are adjacent.

3. The grass catcher as in claim 1 wherein the connection means comprises a pin and hook bracket extending from the flat side wall.

4. The grass catcher as in claim 1 wherein the top wall, second side wall, and bottom wall are a single, continuous sheet of material.

5. The grass catcher as in claim 1 further having a hinge comprising tabs upstanding from the cover and slits in the second side wall through which the tabs extend.

* * * * *